United States Patent [19]

Chollet

[11] 4,426,353
[45] Jan. 17, 1984

[54] DEVICE FOR THE DISENGAGEMENT OF A NUCLEAR REACTOR FUEL ELEMENT FROM AN ARTICULATED FINGER GRAPNEL AND METHOD OF USING SAME

[75] Inventor: Francis Chollet, Marly le Roi, France

[73] Assignee: Framatome, Courbevoie, France

[21] Appl. No.: 265,020

[22] Filed: May 19, 1981

[30] Foreign Application Priority Data

Jun. 12, 1980 [FR] France .............................. 80 13084

[51] Int. Cl.³ ............................................. G21C 19/22
[52] U.S. Cl. ...................................... 376/262; 376/264
[58] Field of Search ............... 376/261, 262, 260, 264, 376/268, 271

[56] References Cited

U.S. PATENT DOCUMENTS 3,152,830 10/1964 Pounder et al. ..................... 376/264
3,856,621 11/1974 Suvanto et al. ..................... 376/271

FOREIGN PATENT DOCUMENTS 2436507 2/1976 Fed. Rep. of Germany ...... 376/268
2905985 8/1979 Fed. Rep. of Germany ...... 376/268
1528762 5/1968 France .
54-102488 8/1979 Japan ................................... 376/268

Primary Examiner—Sal Cangialosi
Attorney, Agent, or Firm—Pollock, Vande Sande & Priddy

[57] ABSTRACT

Device for the underwater disengagement of a nuclear reactor fuel element from a grapnel with at least two articulated fingers. The device is designed to be placed on the end of a duct for positioning fuel elements and includes jacks for adjusting the relative positions of the device and of the grapnel-fuel element unit and for maintaining these positions, further jacks for unfastening the fingers of the grapnel from the body of the grapnel and still further, jacks for tilting the fingers of the grapnel so as to enable the fingers to release their hold on the fuel element.

6 Claims, 6 Drawing Figures

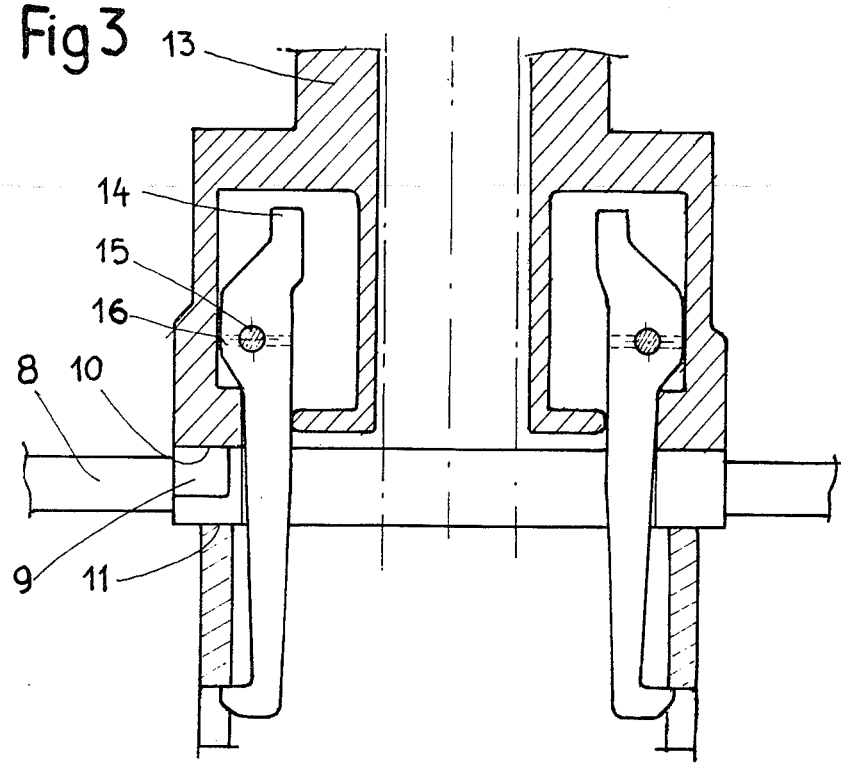
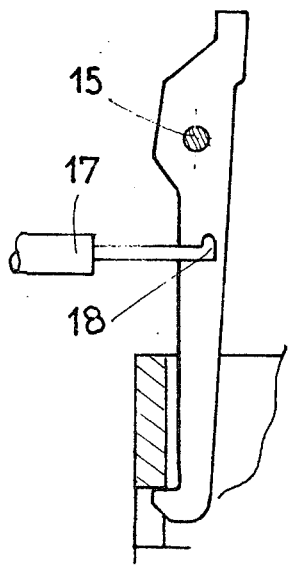 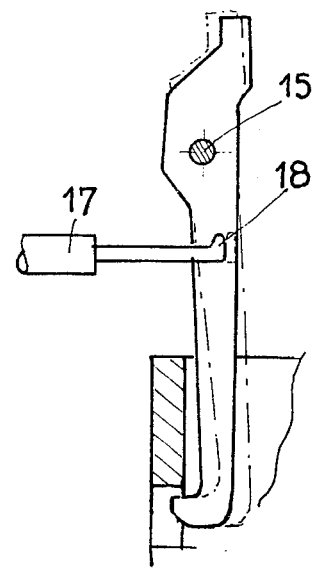 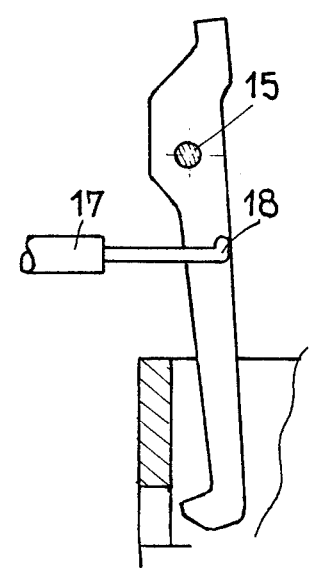

DEVICE FOR THE DISENGAGEMENT OF A NUCLEAR REACTOR FUEL ELEMENT FROM AN ARTICULATED FINGER GRAPNEL AND METHOD OF USING SAME

FIELD OF THE INVENTION

The invention relates to the manipulation of fuel elements of a nuclear reactor.

BACKGROUND OF THE INVENTION

Grapnels with articulated fingers have been used for a considerable time for such manipulations. By way of example, reference may be made to French Patent No. 1,528,762.

It sometimes happens that it is impossible to manoeuvre the grapnel. This impossibility can arise, e.g., from electrical or mechanical failure of the system actuating the articulated fingers, jamming of the fingers, or interfering objects preventing the movement of the fingers.

Whatever the cause of this inability to operate the articulated fingers of the grapnel, rapid action must be taken to disengage the fuel element from the grapnel in order not to arrest the nuclear reactor for too long. This task is all the more difficult as the intervention must be performed at a distance and the grapnel is under water.

Manipulating devices for fuel elements are known using a grapnel with articulated fingers, which have an integrated repair system enabling action to be taken on the locking of the grapnel in an emergency. However, these devices are fairly complex handling machines wherein the repair system is integrated with a mast and with a rigid framework (reference may be made, for example, to applicants French Patent Application No. 76-12545, filed Apr. 28, 1976). In addition to these systems only constitute emergency action on the actuation of the locking system and do not act directly on the fingers of the grapnel.

SUMMARY OF THE INVENTION

It is an object of the present invention to provide a repair device for grapnels with articulated fingers the construction of which is simple and which acts directly on the fingers. It is another object of the invention to provide a device which can thus act rapidly and very effectively underwater, immediately releasing the fuel element held by the fingers of the grapnel.

It is a further object to provide a device which enables the disengagement of a part held in the fingers of a grapnel comprising at least two articulated fingers and, more particularly, for the disengagement of a nuclear reactor fuel element from the fingers of a grapnel designed for the manipulation of the latter in the reactor, and under protection constituted by a layer of water.

According to the invention, the device is designed to be placed on the end of a duct for positioning or withdrawing a fuel element. This device comprises:

means for adjusting the relative positions of said device and of the grapnel-fuel element unit and for holding these positions, means for unfastening the fingers of the grapnel from the body of the grapnel, and means for tilting the fingers of the grapnel enabling the fingers to release their hold on the fuel element.

According to a preferred feature of the invention, said adjustment means are constituted by:

a base plate enabling the centering of the device on the end of the duct, borne by this base plate, at least two vertical guide means each constituted by a guide column on which is mounted a spring and supporting a second plate, parallel with the base plate, and borne by the second plate, at least two jacks actuating tabs designed to be applied on a reference surface of the grapnel and to assure the holding of the relative positions of the disengagement device and of the grapnel.

Again according to a preferred feature of the invention, the unfastening means for the fingers of the grapnel from the body of the grapnel are constituted by at least two jacks each placed in extension of the articulation axis of one of the fingers and each provided with a push rod which drives out the axle of the finger shearing the pins holding this axle.

As for the means for tilting the fingers of the grapnel, they are preferably constituted by at least two jacks, each of the jacks being perpendicular to one of the fingers and being equipped with a foot for retaining and pushing this finger.

According to another aspect of the invention, there is provided a method for disengaging a nuclear reactor fuel element from a grapnel with at least two articulated fingers. This method uses the device which has just been described. According to this method, there is placed underwater, by means of a handling crane used in the usual manner in nuclear reactors, a device according to the invention on the end of a duct for positioning of withdrawing fuel elements. The fuel element that it is desired to disengage from the grapnel is inserted into the duct; the relative positions of the disengagement device and of the grapnel are adjusted; the axles of each of the fingers are driven out successively while retaining the latter simultaneously by means of holding feet; each of the fingers is tilted by means of said feet in order to release the fuel element, and the grapnel is raised again.

DETAILED DESCRIPTION OF THE INVENTION

In order that the invention may be more clearly understood, it will now be described in more detail with reference to a particular embodiment given purely by way of example and shown in the accompanying drawings.

In the drawings:

FIG. 3 shows a detail of FIG. 2, showing on a larger scale, a finger of the grapnel with a jack for actuating a tab which has been applied to a reference surface of the grapnel.

FIGS. 4, 5 and 6 show details of a section along the line III—III of FIG. 1. More precisely, these Figures show jacks for tilting the fingers.

FIG. 4 shows the finger before its axle has been driven out, the holding foot of the jack being in intermediate position, ready to hold the finger.

FIG. 5 shows the finger, immediately after its axle has been driven out, the retaining foot holding the finger.

FIG. 6 shows the retaining foot at the end of its course, after the latter has pushed the finger so as to tilt it and release the fuel element from the hold of the finger.

Figure 2:
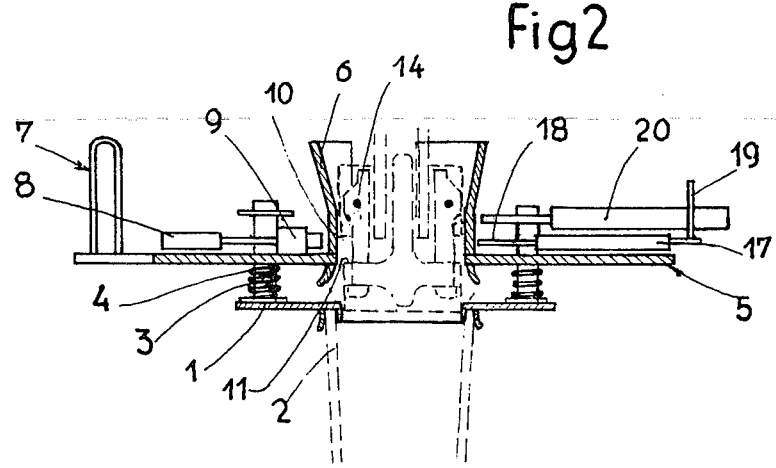
FIG. 2 shows a section along the line II—II of FIG. 1.
Figure 1:
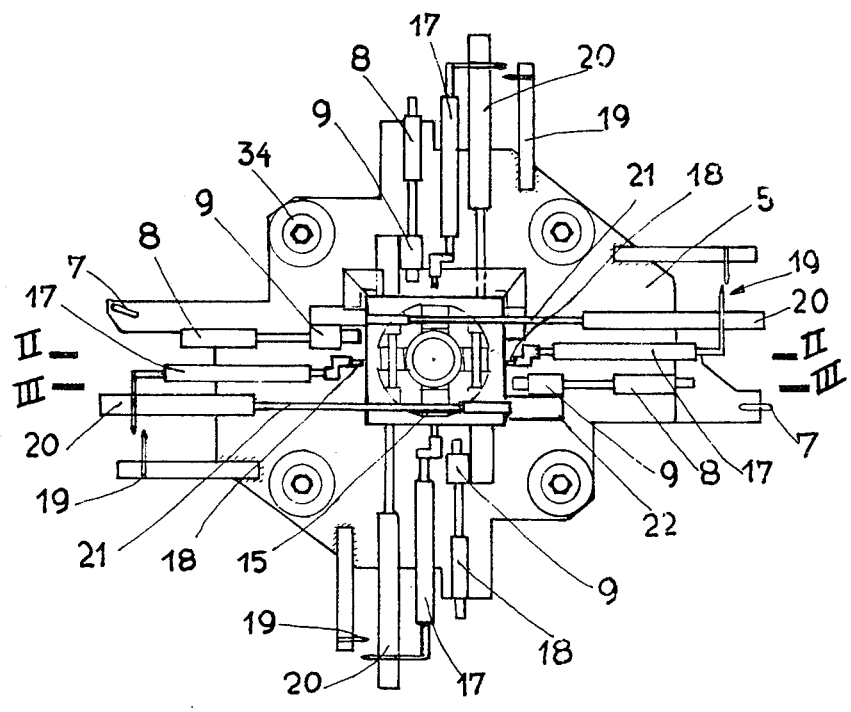
FIG. 1 is a plan view of a disengagement device according to the invention.

Reference will first be made to FIGS. 1 and 2.

The disengagement device for a fuel element from a grapnel with articulated fingers according to the invention comprises a base plate 1 capable of being fitted onto the female cone of a duct 2 for positioning or withdrawing fuel elements. The base plate 1 thus fulfils the function of centering the device.

The base plate 1 bears four vertical guides each including a guide column 3 on which a spring 4 is mounted. These guide columns support a second plate 5, parallel to the base plate 1. The second plate 5 supports a guide horn 6 provided for the insertion of the fuel element-grapnel unit; it also bears twelve jacks equipped with push rod and specialized end pieces which will be described below. The plate 5 also supports handling rings 7, the pneumatic and hydraulic inlet support for the jacks (not shown), the various jack supports and marks for the movement of the jacks.

The device comprises three series of four jacks, each of the four jacks being provided for one of the four fingers. The four jacks 8 actuate the tabs 9 which, when they are extended, become supported between a reference surface 10 of the grapnel and the rim 11 of the upper end of the fuel element.

Reference may be made to FIG. 3 which shows in detail a jack 8 the tab 9 of which is extended. In this figure, the body 13 of the grapnel on which the fingers 14 are articulated by means of articulation axles 15 retained by the stop pins 16, are shown. The fingers 14 are in engagement with a fuel element the upper rim of which has been denoted by 11. The tab 9 of the jack 8 has come into position on a reference surface of the grapnel which is denoted by the reference part 10 above the upper edge 11 of the fuel element. Once the tap 9 is positioned beneath the reference surface 10 and above the rim 11, the position of the plate 5 is determined, by approaching above the tab 9 and the reference surface 10 of the grapnel. Thus the jacks designed to drive out the axles of the fingers are placed exactly in extension of these axles and are ready to act. As the jacks need exert no force, pneumatic jacks are sufficient.

A second series of jacks 17 each equipped with a retaining foot 18 constitutes the means for tilting fingers of the grapnel and determines the kinematics of withdrawal of the fingers when the latter are released from their pivoting axle. These jacks, which must provide a force greater than the force provided by the jacks 8, will preferably be hydraulic jacks. Control marks for the movements of the jacks 17 are denoted by 19 (FIG. 1).

Before studying in more detail the kinematics of withdrawal of the fingers by means of the jacks 17, it is necessary to mention the third series of jacks 20, also hydraulic, which are equipped with push-rods 21 designed to shear the retaining pins 16 of the axles 15 of the fingers 14 and to drive out the axles 15.

In FIG. 1, two of the push-rods 21 have been shown in action, the axles 15 being driven out and ready to fall into their respective receiving chutes 22. The two other push-rods 21 are again in rest position.

The operation of the device will now be described.

In the case where a grapnel has broken down, i.e., when it is not possible to uncouple the fuel element from the grapnel assuring its retention by the usual means provided for this purpose, the device according to the invention is utilized.

First of all, an underwater duct for positioning or withdrawing a fuel element is selected; this duct may be any one. At the bottom of this duct is placed a thickness shim by means of a manual tool (for this manipulation, the thickness shim should have a geometry identical with that of an upper end of the fuel element). The function of this shim is to raise the positioning level of the fuel element assembly so that the upper end of the latter extends sufficiently beyond the duct to be accessible. The approximate length of the fuel element concerned is always known; hence a shim corresponding to this length will be selected.

There is then placed underwater, by means of a conventional handling tool, the device according to the invention onto the end of the duct; more precisely, base plate 1 is centered on end 2.

Into the duct is then introduced the fuel element which is held by the grapnel.

The adjustment of the relative positions of the unfastening device according to the invention and of the fuel element-grapnel unit then follows. This adjustment is carried out by means of jacks 8, as has been explained above. The second plate 5, support for the jacks, takes up during the lowering of the grapnel the position that it will retain during the whole repair of the grapnel.

The jacks 17 are then actuated in order that the retaining feet 18 may fulfil the function of holding the fingers of the grapnel (FIG. 4). It will be noted that the fingers 14 are each provided with a notch enabling the passage of the leg 18.

One is then ready to actuate the jacks 20 so as to drive out the axles 15 of the fingers 14 by shearing the retaining pins 16. The jacks 20 are actuated in pairs symmetrically with respect to the center of the grapnel. The axles 15 are recovered in suitable chutes (see FIG. 1).

Referring to FIG. 5, the position of a jack 17 is seen after the axle 15 of the finger has been driven out. The retaining foot 18 holds the finger 14 in its initial position.

The jacks 17 are then actuated so that the foot 18 plays a role of a thrust foot causing the finger 14 to tilt until disengagement from its position of gripping under the rim 11 of the upper end of the fuel element 12 (see FIG. 6).

It is then possible to raise the grapnel slightly so that the fingers arrive above their engagement plane, and then retract the jacks 17 before disengaging the tabs 9 and entirely raising the grapnel. Now that the fuel element has been released from the grapnel, it is possible to repair the latter more easily, devoting thereto as much time as necessary.

It is then possible to seek the fuel element which has remained within the duct by means of a new grapnel.

The present device as well as the method of using this device has the very important advantage of enabling the repair, very rapidly and at a distance underwater, of a grapnel engaged with a fuel element. It has the additional advantage of being very simple and of being able to use existing installations for its positioning and the operation of the jacks.

In fact, the pneumatic hydraulic supply of the jacks is very simple, since there already exists in the building of the reactor a pneumatic distribution panel for the current handling of fuel elements and a hydraulic power source used for the shearing of irradiation specimens. The device according to the invention hence does not necessitate any equipment other than that already existing in the reactor.

The invention is not limited to the embodiments which has just been described, but comprises also any embodiments which differ therefrom only in detail or in the use of equivalent means.

Thus, the invention applies to grapnels comprising a number of fingers which may be other than four. It suffices to provide, for each finger, the three jacks necessary.

The device and the method according to the invention are generally used in a nuclear reactor, but it would be possible to imagine the use of such a device and such a method in other fields, by modifying, if necessary, certain details.

What is claimed is:

1. Device for the underwater disengagement of a nuclear reactor fuel element from a grapnel having at least two articulated fingers for positioning on the tip of a duct for positioning fuel elements, comprising
    (a) means for adjusting the relative positions of said device and the grapnel-fuel element unit and for maintaining these positions;
    (b) means for disengaging said fingers from the body of said grapnel; and,
    (c) means for tilting said fingers to cause said fingers to release their hold on said fuel element.

2. Device according to claim 1, wherein said adjustment means comprise
    (a) a base plate for centering said device on the tip of said duct;
    (b) at least two vertical guide means borne by said base plate, each of said guide means being constituted by a guide column having a spring mounted thereon and supporting a second plate parallel to said base plate;
    (c) at least two jacks borne by said second plate for actuating lugs applied beneath a reference surface of said grapnel to assure maintenance of the relative positions of said disengagement device and said grapnel.

3. Device according to claim 1 or 2, wherein said disengaging means are constituted by at least three jacks each placed in extension of the articulation axle of one of said fingers and each provided with a push rod which drives said axle out of said finger by shearing pins retaining said axle.

4. Device according to claim 3, comprising recovery chutes for said articulation axles.

5. Device according to claim 1 or 2, wherein said tilting means are constituted by at least two jacks, each of these jacks being perpendicular to one of said fingers and having a foot for retaining and pushing said finger.

6. Method for disengaging a nuclear reactor fuel element from a grapnel having at least two articulated fingers, comprising the steps of
    (a) positioning under water by means of a handling tool a device comprising means for adjusting the relative positions of said device and said grapnel-fuel element unit and for maintaining these positions, means for disengaging said fingers from the body of said grapnel, and means for tilting said fingers, said device being positioned on the tip of a duct for positioning a fuel element;
    (b) introducing into said duct a fuel element to be disengaged from said grapnel;
    (c) adjusting the relative positions of said disengaging device and said grapnel;
    (d) successively driving out the axles from each of said fingers while simultaneously holding the latter by means of retaining feet;
    (e) tilting each of said fingers by means of said feet in order to release the said element; and
    (f) raising said grapnel.

* * * * *